US009813192B2

(12) United States Patent
Loprieno et al.

(10) Patent No.: US 9,813,192 B2
(45) Date of Patent: Nov. 7, 2017

(54) CODING SCHEME AND MULTIFRAME TRANSMISSION IN OPTICAL NETWORKS (71) Applicant: Cisco Technology, Inc., San Jose, CA (US)

(72) Inventors: Gilberto Loprieno, Milan (IT); Davide Codella, Cermenate (IT)

(73) Assignee: Cisco Technology, Inc., San Jose, CA (US)

(*) Notice: Subject to any disclaimer, the term of this patent is extended or adjusted under 35 U.S.C. 154(b) by 236 days.

(21) Appl. No.: 14/669,079

(22) Filed: Mar. 26, 2015

(65) Prior Publication Data
US 2016/0285547 A1   Sep. 29, 2016

(51) Int. Cl.
*H04L 1/00* (2006.01)
*H04L 1/20* (2006.01)
*H04B 10/077* (2013.01)
*H04J 3/00* (2006.01)

(52) U.S. Cl.
CPC ....... *H04L 1/0063* (2013.01); *H04B 10/0775* (2013.01); *H04J 3/00* (2013.01); *H04L 1/20* (2013.01); *H04L 1/201* (2013.01); *H04B 2210/072* (2013.01); *H04L 1/0057* (2013.01)

(58) Field of Classification Search
CPC ...... H04J 3/1652; H04J 3/14; H04J 2203/006; H04B 10/25; H04L 1/0061; H04L 1/203
USPC .......................................................... 398/27
See application file for complete search history.

(56) References Cited

U.S. PATENT DOCUMENTS

| 5,568,486 | A | * | 10/1996 | Huscroft | ............... H04J 3/0608 370/395.2 |
| 5,784,387 | A | | 7/1998 | Widmer | |
| 5,835,496 | A | * | 11/1998 | Yeung | ................... H04J 3/0632 370/514 |
| 7,953,101 | B2 | | 5/2011 | Loprieno et al. | |
| 8,189,485 | B2 | * | 5/2012 | Yan | ........................... H04J 3/14 370/241 |
| 8,359,525 | B2 | * | 1/2013 | Shin | ...................... H04J 3/1658 370/470 |
| 8,942,379 | B2 | * | 1/2015 | Loprieno | .............. H04L 9/3226 380/256 |
| 9,083,516 | B2 | * | 7/2015 | Chiesa | ...................... H04L 9/12 |
| 2002/0120902 | A1 | * | 8/2002 | Brown | .................... H04J 3/047 714/776 |
| 2004/0015691 | A1 | | 1/2004 | Collette et al. | |

(Continued)

OTHER PUBLICATIONS

"Fibre Channel Physical Interface-6 Rev 3.10", Global Engineering, INCITS working draft proposed American National Standard for Information Technology, Oct. 25, 2013, 67 pages.

(Continued)

*Primary Examiner* — David Payne
*Assistant Examiner* — Tanya Motsinger
(74) *Attorney, Agent, or Firm* — Edell, Shapiro & Finnan, LLC (57) ABSTRACT

An optical frame is received over an optical link within an optical network. The optical frame contains a payload of aggregated data, an alignment value, and a bit interleaved parity value. The content of the optical frame is aligned based on the alignment value. The bit interleaved parity value is monitored. In response to the monitoring, a transmission quality of the transmission link is determined.

20 Claims, 9 Drawing Sheets

(56) References Cited

U.S. PATENT DOCUMENTS

| | | | | |
|---|---|---|---|---|
| 2004/0126111 A1* | 7/2004 | Cho | H04B 10/00 | 398/33 |
| 2007/0104485 A1* | 5/2007 | Zhang | H04J 14/0241 | 398/69 |
| 2007/0269218 A1* | 11/2007 | Zhang | H04J 3/1652 | 398/140 |
| 2008/0267622 A1* | 10/2008 | Loprieno | H04J 3/14 | 398/27 |
| 2009/0169217 A1* | 7/2009 | Meagher | H04J 3/047 | 398/140 |
| 2009/0202239 A1* | 8/2009 | Holness | H04J 3/14 | 398/33 |
| 2010/0296811 A1* | 11/2010 | Ohira | H04L 1/0009 | 398/72 |
| 2011/0126074 A1* | 5/2011 | Calderon | H04L 1/0057 | 714/752 |
| 2012/0148236 A1* | 6/2012 | Kumar | H04J 3/14 | 398/34 |
| 2012/0263475 A1* | 10/2012 | Su | H04J 3/1652 | 398/100 |
| 2013/0156420 A1* | 6/2013 | Amitai | H04B 10/07953 | 398/27 |
| 2013/0235886 A1* | 9/2013 | Wang | H04N 19/70 | 370/474 |
| 2014/0177652 A1* | 6/2014 | Su | H04L 47/16 | 370/476 |
| 2015/0046775 A1* | 2/2015 | Prodan | H04L 1/0076 | 714/776 |

OTHER PUBLICATIONS

"Fibre Channel Framing and Signaling—4 (FC-FS-4) Rev 110", Information Technology Industry Council, INCITS working draft proposed American National Standard for Information Technology, Aug. 5, 2014, 460 pages.

* cited by examiner

CODING SCHEME AND MULTIFRAME TRANSMISSION IN OPTICAL NETWORKS

TECHNICAL FIELD

The present disclosure relates to frame transmission in optical networks.

BACKGROUND

Current standards for 32 gigabit per second Fiber Channel communications (32GFC) use forward error correction. Forward error correction procedures utilize complex algorithms that involve significant processing resources to complete. Current techniques to calculate bit error rates (i.e., the quality of service) of optical transmission links use forward error correction (i.e., forward error correction must be terminated).

Aligning optical frames for 32GFC communications requires that there be no errors on an optical transmission link. Specifically, alignment of 32GFC optical frames can only be detected once the forward error correction redundancy received is equal to the redundancy extracted during a forward error correction procedure.

DESCRIPTION OF EXAMPLE EMBODIMENTS

Overview

In accordance with one embodiment, an optical frame is received over an optical link within an optical network. The optical frame has a payload of aggregated data, an alignment value, and a bit interleaved parity value. Content of the optical frame is aligned based on the alignment value so as to locate the bit interleaved parity value within the optical frame. The bit interleaved parity value is monitored. In response to the monitoring, a transmission quality of the transmission link is determined based on the bit interleaved parity value.

Example Embodiments

Figure 1:
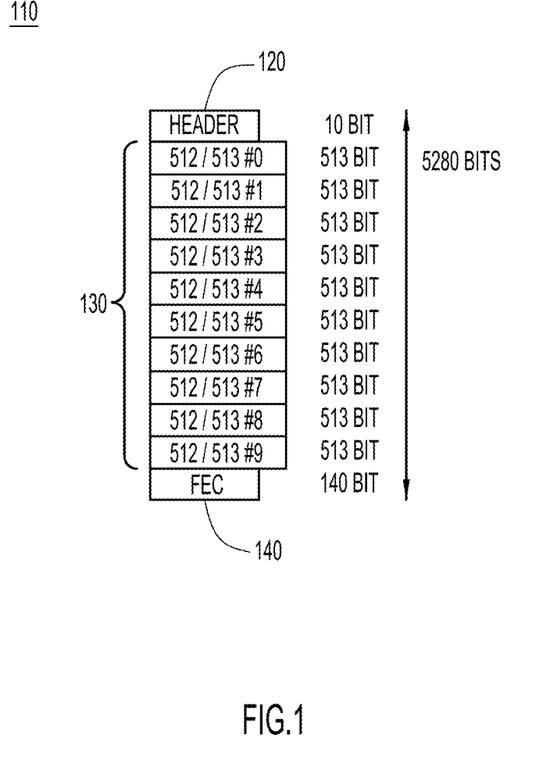
FIG. 1 is an illustration of an optical frame configured to provide frame alignment and transmission link quality of service determinations without having to perform forward error correction on the frame payload, according to an example embodiment.

Depicted in FIG. 1 is an optical frame 110 configured to provide for transport over an optical fiber channel, for example, 32 Gigabits per second Fibre/Fiber Channel (referred to herein as "32GFC"). Specifically, frame 110 is configured to facilitate frame alignment without first performing forward error correction at the receiving end of an optical fiber channel.

Frame 110 includes header portion 120, payload portion 130, and forward error correction field 140. Header 120 contains 10 bits, and may include a frame alignment "word," or a command word. Payload portion 130 is 5130 bits long, and is comprised of ten 512/513B code words, for a total size of 5130 bits of information. Forward error correction portion 140 includes 140 bits of forward error correction (FEC) redundancy.

Although the structure of frame 110 is not limited to use in 32GFC communication networks, its structure allows for the inclusion of the alignment word while maintaining 32GFC data rates. Specifically, by employing 512/513B coding in payload portion 130, sufficient "room" is made in frame 110 such that forward error correction field 140 and a 10 bit alignment word can be included in header 130 such that the frame 110 is small enough to achieve 32GFC data rates. For example, in the current 32GFC standard, the International Committee for Information Technology Standards (INCITS) standard T11, 255/256B encoding is used on the payload of 32GFC frames. Due to the lower level of aggregation provided by 255/256B transcoding, it may not be possible to provide a sufficiently accurate alignment word in a frame while maintaining 32GFC data rates.

Figure 2:
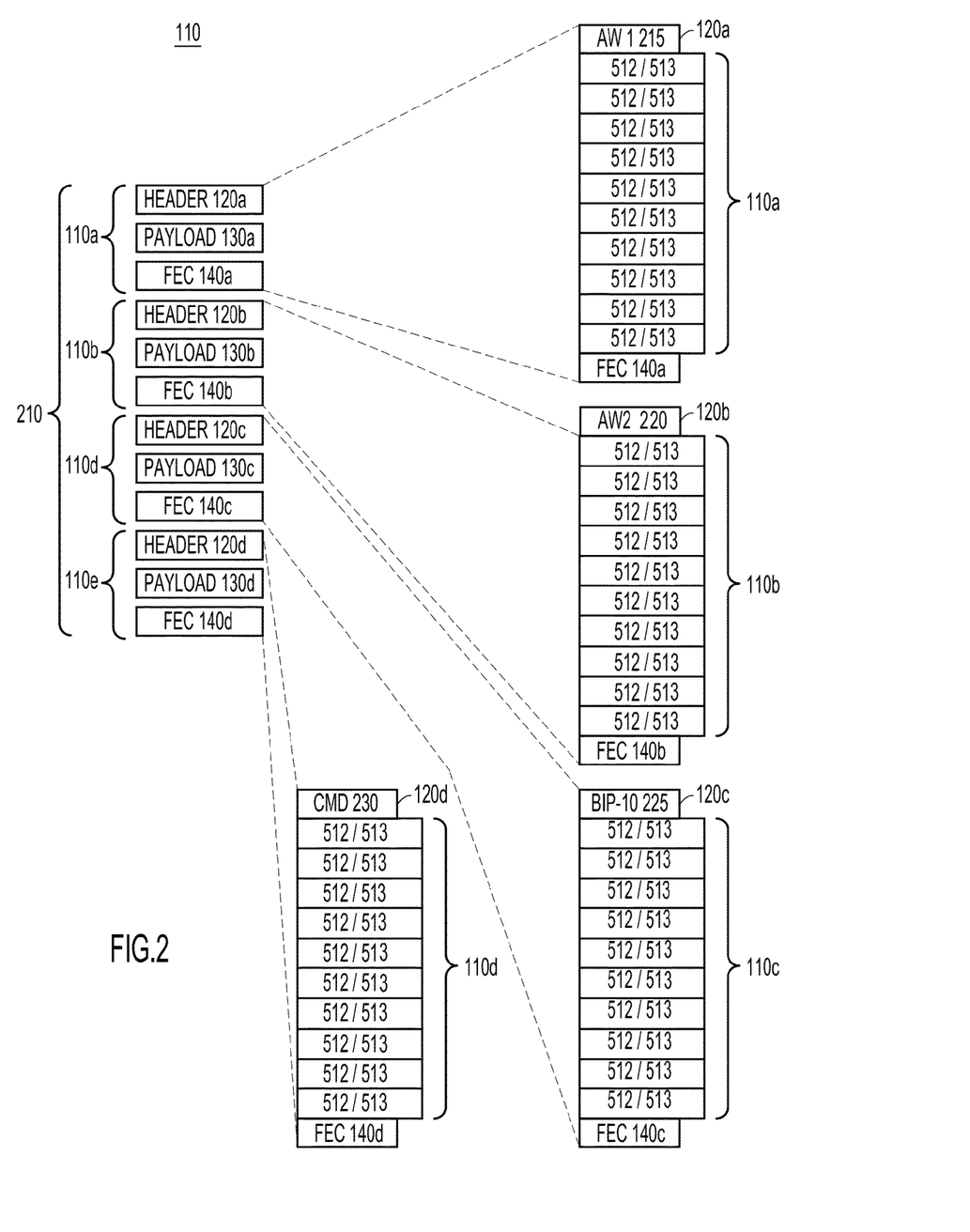
FIG. 2 is an illustration of an optical multiframe configured to provide frame alignment and transmission link quality of service determinations without having to perform forward error correction on the frame payload, and in which in-band command signaling is performed over optical transmission links, according to an example embodiment.

With reference now made to FIG. 2, depicted therein is a structure of a multiframe 210 which may be utilized to provide Fiber Channel communications, such as 32GFC communications, while adding additional accuracy, flexibility and functionality. Multiframe 210 is constructed from four frames 110a-d, which are analogous to those of frame 110 of FIG. 1, in that they contain header portions 120a-d, payload portions 130a-d, and forward error correction fields/portions 140a-d, respectively.

By arranging four frames 110a-d into the single multiframe 210, the header portions for the four frames 110a-d can be shared. According to the example of FIG. 2, an alignment word is split between header 120a of frame 110a and header 120b of frame 110b. Specifically, a first portion of the alignment word, AW1 215, is included in header 120a, and a second portion of the alignment word, AW2 220, is arranged in header 120*b*. Accordingly, a 20 bit alignment word may be used to align multiframe 210, resulting in more accurate alignment. In multiframe 210, 10 bits of the alignment word are arranged within header 120*a* of frame 110*a* as AW1 215 and the remaining 10 bits are arranged within header 120*b* of frame 110*b* as AW2 220. The alignment word may also be split between any two of headers 120*a-d*. The alignment word may also be split between three or more headers, and may be of a size greater than 20 bits. By including the alignment word, multiframe 210 can be aligned without performing forward error correction.

Furthermore, as a result of sharing headers 120*a-d*, additional functionality may be included in multiframe 210. For example, included in header 120*c* is a bit interleaved parity 10 value (BIP-10 225). BIP-10 225 is used to determine a bit error rate (BER) for the transmission link over which multiframe 210 is received. For example, a BIP-10 value may be used to determine a BER based on the way a BIP-10 value is calculated. Specifically, the BIP-10 value is an indication of the parity of the preceding frame. When the BIP-10 value differs from what is actually received, a BER may be estimated for the transmission link. By sharing the header values, both an alignment word and a BIP-10 value may be included in multiframe 210, providing additional functionality to multiframe 210. Of course, other BER calculation values may be used instead of BIP-10. For example, BIP-8 values may be used, or other values necessary to perform non-bit interleaved parity quality estimate techniques may be used.

With headers 120*a* and 120*b* containing portions of an alignment word, and header 120*c* containing the BER calculation value, header 120*d* is still available to provide additional functionality. Accordingly, FIG. 2 illustrates a command word, CMD 230, included in header 120*d*. CMD 230 can be configured to provide indications of a client signal failure, an indication of a remote error, and/or indications of remote defects. CMD 230 can also be used to set protocol options, or optical parameters. For example, CMD 230 can be used to indicate whether or not the frame or multiframe should be processed or regenerated with forward error correction. As a further example, CMD 230 in header 120*d* can also be used to specify a particular wavelength over which the frame or multiframe should be sent over an optical transmission link. In other words, CMD 230 can provide in-band signaling between nodes of an optical network.

Figure 3:
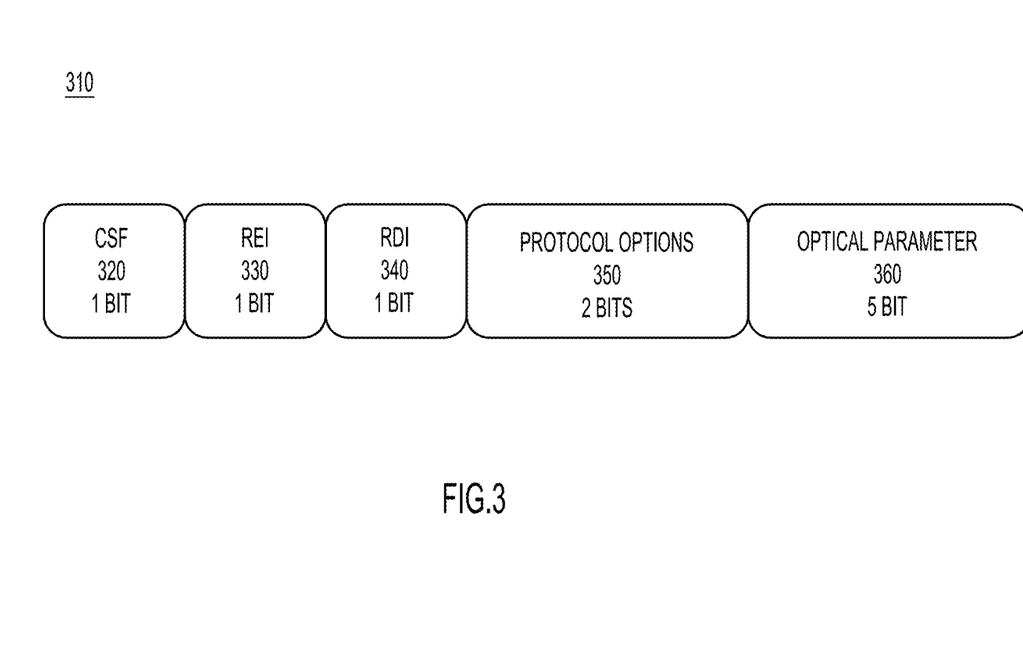
FIG. 3 is an illustration of an example command word configured to provide in-band signaling over optical transmission links, according to an example embodiment.

Depicted in FIG. 3 is an example of a command word 310, useful in header 120*d* of FIG. 2. Command word 310 includes five portions: 1) client signal fail bit 320; 2) remote error indication bit 330; 3) remote defect indication bit 340; 4) a 2 bit protocol option field 350; and 5) a 5-bit optical parameter field 360. Through the use of such a structure, command word 310 may be used to provide an in-band signaling channel that allows for proprietary information (e.g., remote criteria or optical parameters) to be transmitted between optical network connected devices, including transmission between near and far end nodes.

The client signal fail bit 320 may serve as an indication of a failure on the part of the sending device, such as a loss of signal or a loss of synchronization. When either of these events takes place, the client signal fail bit may be set to 1. According to other examples in which the client signal failure field 320 is greater than 1-bit, the values populating the field may differentiate between different types of failures.

The remote error indication bit 330 may be set to "1" when at least one error bit is seen by a remote node. Similarly, the remote defect indication bit 340 may be set to "1" when the far end node detects a defect on the receiving link, such as a loss of signal or a loss of synchronization.

The 2-bit protocol option field 350 may be used to indicate options specific to the protocol over which the frame or multiframe was sent. For example, when transmitting frames using the 32GFC standard, the protocol option field 350 may be used to indicate whether or not the frame or multiframe is being sent with forward error correction. According to one particular example, if the second bit of the protocol option field 350 is a "0," it will serve as an indication that the frame is being sent with forward error correction. On the other hand, when the second bit of the protocol option field 350 is set to "1," it serves as an indication that the frame or multiframe is being sent without forward error correction. The first bit of the protocol option field may be reserved to indicate a different option, or the two bits may be taken to together to indicate options having up to four possible different states. The optical parameter field 360 may be used to set options specific to optical transmission, such as the particular wavelength over which the frame is to be sent, the type of optical module used to transmit the frame (e.g., type of optical module (Short reach, Long Reach, Single Mode, Multimode, etc.), the optical modulation amplitude, equalization and pre-emphasis parameters, power transmitted and received values, and others.

Figure 4A:
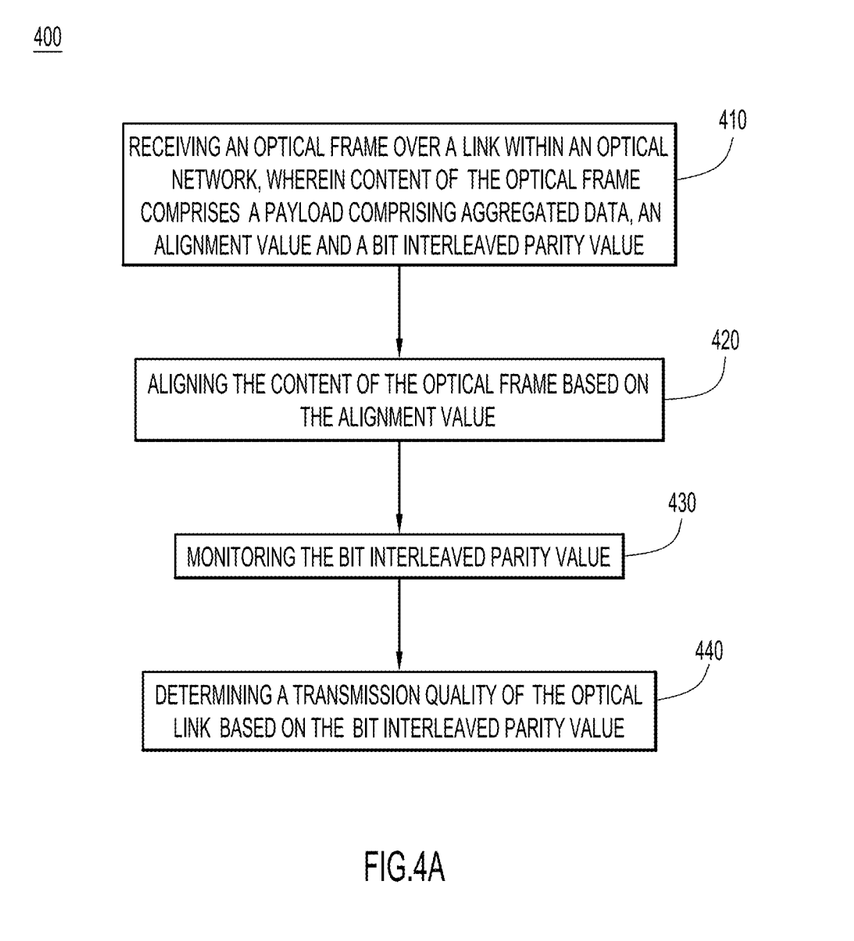
FIG. 4A is a flowchart illustrating a method for processing an optical frame that provides frame alignment and transmission link quality of service determinations without having to perform forward error correction on the frame payload, according to an example embodiment.

With reference now made to FIG. 4A, depicted therein is a flowchart illustrating a method 400 for receiving and processing frames and multiframes, like the frames and multiframes described above with reference to FIGS. 1-3. The process begins in 410 where an optical frame is received at an optical receiver of a node in a network. The content of the optical frame includes a payload of aggregated data, an alignment value, such as an alignment word, and a bit interleaved parity value, such as a BIP-10 value.

At 420, the content of the optical frame is aligned based on the alignment value. For example, the alignment value may be a predetermined string of bits (i.e., an alignment word) that can be recognized by the optical receiver. It may be predetermined that the different portions of the optical frame (e.g., a header portion that may include the bit interleaved parity value, a payload portion and/or a forward error correction portion) are arranged at specific locations relative to the alignment word, such as a predetermined number of bits away from the alignment word. Accordingly, once the alignment word is located, the other portions of the frame may also be located, including the bit interleaved parity value. Once located, the bit interleaved parity value may be used to determine a transmission quality of the link over which the optical frame was received, as is described below.

At 430, the bit interleaved parity value is monitored. The monitoring of the bit interleaved parity value may also include monitoring data received over the optical link over which the optical frame was received so that a transmission quality of the link can be determined. For example, the bit interleaved parity value may be compared with the actual parity of the data received in the current and/or preceding frames. Based on this monitoring, it can be determined whether the parity of the received frames is the same as the parity they contained when they were transmitted. Accordingly, it can be determined whether or not the frames have changed (e.g., "bit flips" have taken place) during the transmission of the frames. In 440 a determination is made regarding the transmission quality of the transmission line based on the monitoring. Subsequent to the determination of the optical transmission quality of the transmission line, additional steps may be taken. For example, if the optical transmission quality is sufficiently high, forward error correction of the payload of the received frame may be performed.

Figure 4B:
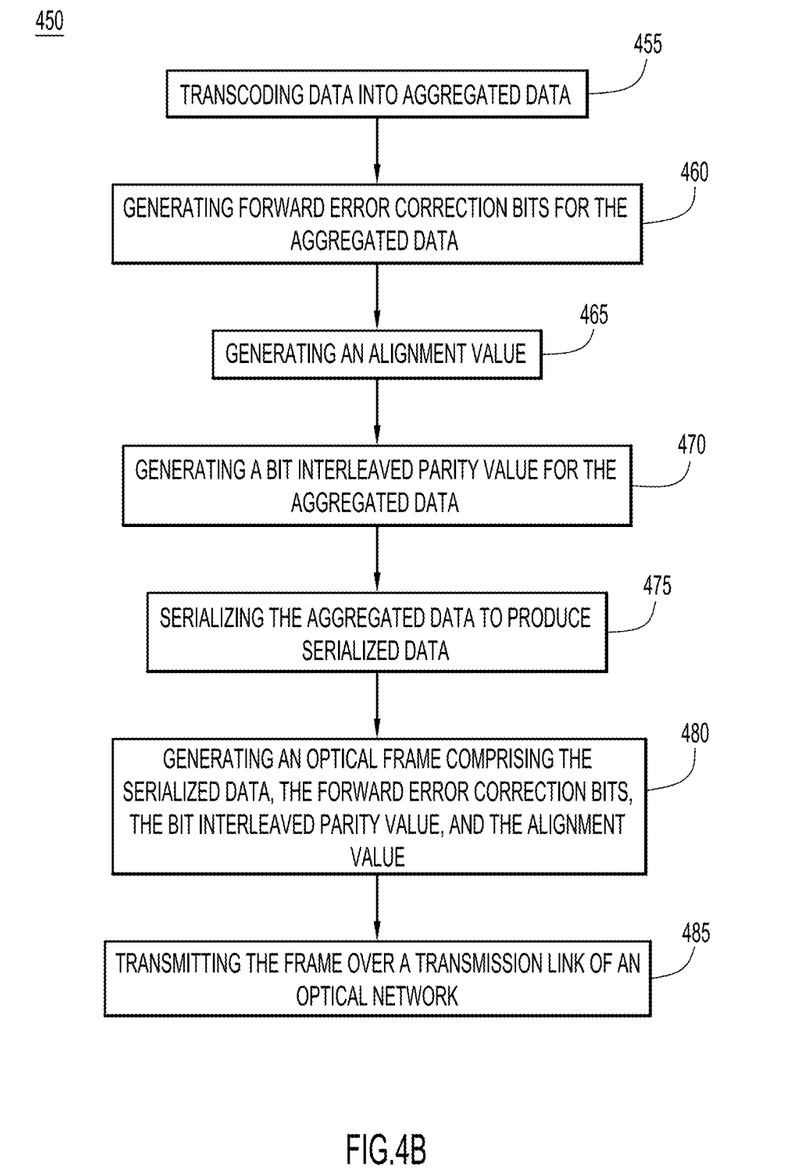
FIG. 4B is a flowchart illustrating a method for generating an optical frame that provides frame alignment and transmission link quality of service determinations without having to perform forward error correction on the frame payload, according to an example embodiment.

With reference now made to FIG. 4B, depicted therein is a flowchart of a method 450 for generating and transmitting frames and multiframes, like the frames and multiframes described above with reference to FIGS. 1-3. The process begins at 455 where data is transcoded into aggregated data. As used herein, "aggregated data" refers to an organization of data that allows for efficient communication and/or transmission of the data payload. For example, the "aggregated data" may include compressed data and/or transcoded data. According to the current example, 64/66B data is transcoded (i.e., aggregated) into blocks of 512/513B data. Reference numeral 455 is an optional step. According to other example embodiments, the data may be received in its aggregated form, or it may be included in a frame or multiframe in an unaggregated form.

In 460, a forward error correction bit is generated for the data, and in 465 an alignment value is generated for inclusion in the frame or multiframe, while in 470 a bit interleaved parity value is generated for the frame of multiframe. The alignment value specifies how content is aligned within an optical frame.

In 475, the data for the frame or multiframe is serialized, and in 480, a frame or multiframe is generated from the aggregated date, the forward error correction bits, the bit interleaved parity value, and the alignment value. The frame or multiframe is then transmitted in 485.

Figure 5:
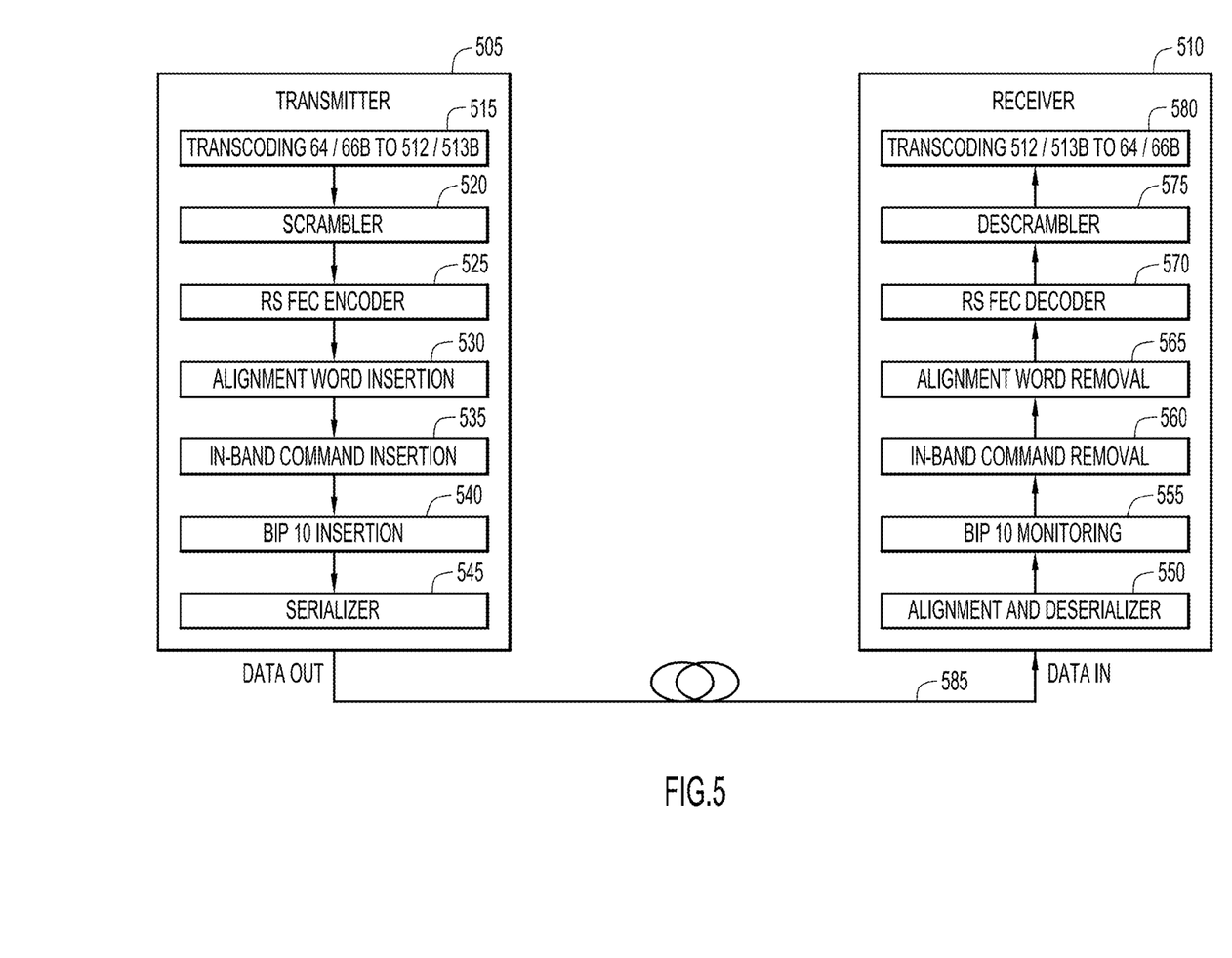
FIG. 5 is a block diagram illustrating a transmitter and a receiver in communication over an optical link and configured to allow simple frame alignment and transmission link quality of service estimates, according to an example embodiment.

With reference now made to FIG. 5, depicted therein is a block diagram of a transmitter 505 and a receiver 510 which are configured to perform a first mode or example of the method described above with reference to FIG. 4. Specifically, transmitter 505 and receiver 510 are configured to transmit and receive frames, such as frame 110 of FIG. 1, and multiframes, such as multiframe 210 of FIG. 2. Accordingly, an implementation of the method of FIG. 4A is performed by receiver 510, while an implementation of the method of FIG. 4B is performed by transmitter 505.

Included in transmitter 505 are transcoder 515, scrambler 520, Reed-Solomon (RS) FEC encoder 525, alignment word insertion block 530, in-band command insertion block 535, BIP-10 insertion block 540, and serializer 545. Receiver 510, on the other hand, includes alignment and deserializer 550, BIP-10 monitoring block 555, in-band command word removal block 560, alignment word remover block 565, RS FEC decoder 570, descrambler 575 and transcoder 580.

When transmitter 505 generates a frame for transmission over optical transmission link 585, transcoder 515 takes payload data in the form of 64/66B data and transcodes it into blocks of 512/513B data. The blocks of 512/513B data may be the ten blocks of data illustrated in FIG. 1, or they may be the 40 blocks of the data distributed over the four frames 110a-d of multiframe 210 of FIG. 2. Once transcoded, the data is scrambled by scrambler 520. The scrambled data is then processed so that a forward error correction code can be applied to the frame by the FEC encoder 525. For example, a forward error correction code may be generated for every 5130 bits of 512/513B data that has been transcoded by the transcoder 515.

With the data transcoded and the forward error correction code applied to it, an alignment word may be added by alignment word insertion device 530. Similarly, command words may be added by command word insertion device 535. The alignment word and/or the command word may be added to a header, such as header 120 of FIG. 1, or they may be spread across multiple headers of a multiframe as described above with reference to multiframe 210 of FIG. 2. At BIP-10 insertion block 510 parity calculations are performed, and a BIP-10 bit interleaved parity value is generated. Finally, at serializer 545 the data is serialized for transmission and a frame, such as frame 110 of FIG. 1, or a multiframe, such as multiframe 210 of FIG. 2, is transmitted over optical transmission link 585.

Upon receipt at receiver 520, a frame or multiframe, will undergo a reverse process to extract the 64/66B data previous encoded and arranged into the received structure. At the alignment and deserializer 550, the frame is first aligned, i.e., the location of the header, payload, and forward error correction code, are determined based on the alignment word included in the frame. For example, the alignment word may comprise a predetermined series of bits. The alignment and deserializer 550 recognizes the presence of the alignment word, which serves as a marker for the location of the header, payload and forward error correction portions of the frame or multiframe. For example, once the alignment word is located, the alignment and deserializer will determine where in the data stream relative to the alignment word the other portions of the frame or multiframe are located. Once aligned, the frame is deserialized and passed to BIP-10 monitoring block 555.

BIP-10 monitoring block 55 evaluates the BIP-10 value contained in the frame. Based on the content of the BIP-10 value, the parity of the current frame or multiframe, the parity of previous frames or multiframes, and/or a determination or estimation regarding the quality of transmission link 585 may be determined. Based upon the quality, once the received frame reaches forward error detection decoder 570, forward error correction decoding may or may not be performed. For example, if the transmission quality of optical link 585 is simply too low for forward error correction to be accurately performed, forward error correction may be skipped and the frame may be dropped from further processing. Prior to forward error correction decoder 570, the command word included in the frame or multiframe may be removed by in-band command word removal block 560. In-band command word removal block 560 may also evaluate the contents of the command, which can affect the subsequent processing of the frame or multiframe. For example, if the command word indicates that the frame or multiframe was sent without forward error correction, forward error correction decoding may be skipped regardless of the quality of transmission link 585. Also prior to forward error correction decoder 570, the alignment word may be removed by alignment word remover block 565.

Once the data is received at forward error correction decoder 570, the data may or may not undergo forward error correction based on the determinations made by BIP-10 monitoring block 555 and in-band command word removal block 555. The output of forward error correction decoder 570 is descrambled at descrambler 575, and the descrambled data is transcoded from 512/513B data to 64/66B data.

Figure 6:
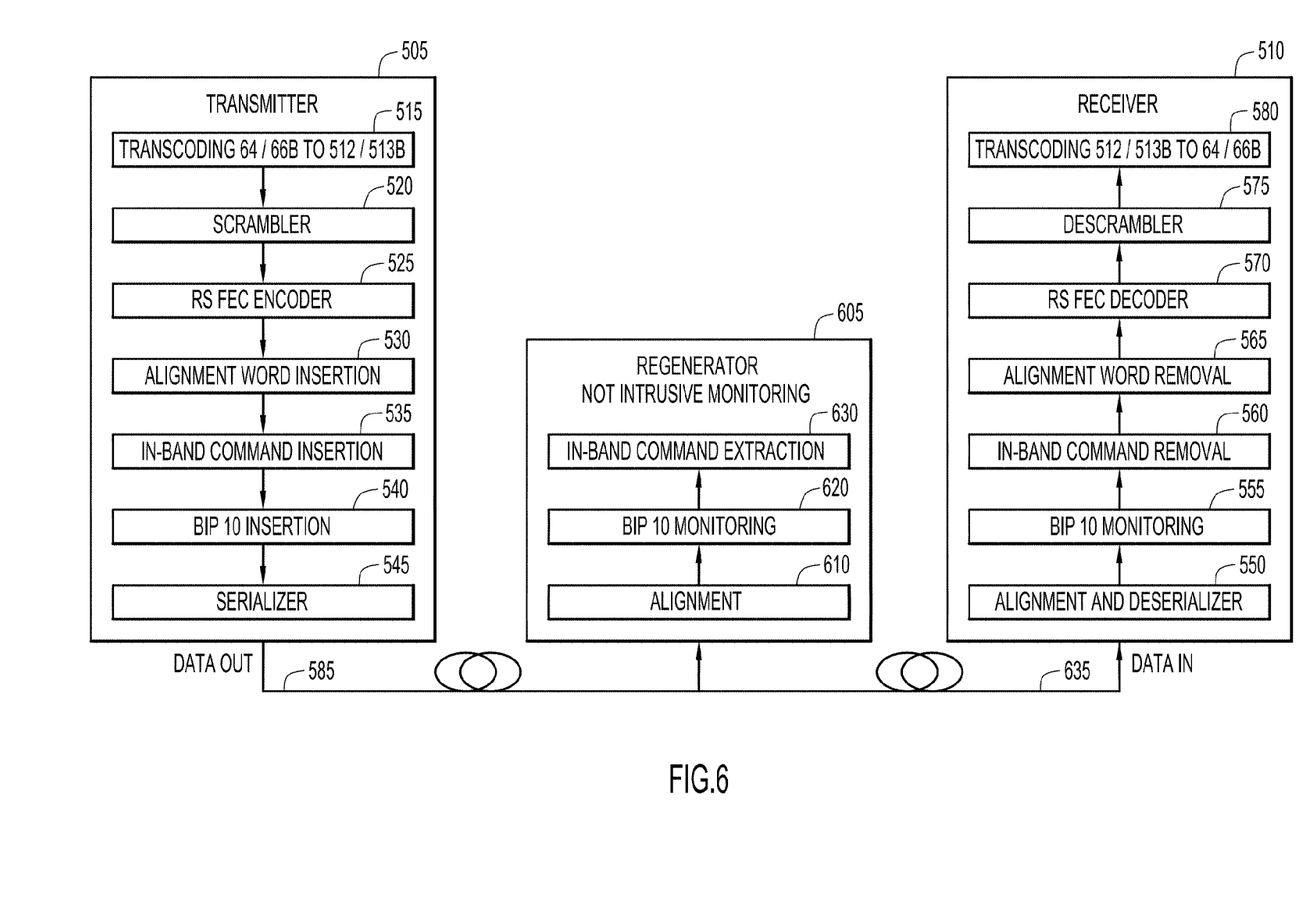
FIG. 6 is a block diagram of a transmitter, a receiver, and a regenerator configured to allow simple frame alignment and transmission link quality of service estimates, and in which the regenerator provides non-intrusive monitoring, according to an example embodiment.

With reference now made to FIG. 6, depicted therein is an example embodiment of the method of FIG. 4A performed at regenerator 605. In the environment illustrated in FIG. 6, a packet will be generated at transmitter 505 as described above with reference to FIG. 5. The regenerator 605 includes an alignment block 610, a BIP monitoring block 620 and an in-band command extraction block 630. Once transmitted over transmission link 585, the frame is received at regenerator 605. The alignment block 610 aligns the frame by recognizing the predetermined alignment word within the content of the received frame. Once aligned, the bit interleaved parity value is monitored by BIP-10 monitoring block 620.

This monitoring allows regenerator 605 to determine the transmission quality of transmission link 585. Specifically, because the transmission quality is determined without performing deep inspection of the frame payload data and/or without performing forward error correction on the payload data, the bit interleaved parity data allows for regenerator 605 to perform a "low cost" evaluation of transmission line 585. For example, the monitoring of a bit interleaved parity value is relatively less digital signal processing intensive than forward error correction. Accordingly, an evaluation based on parity calculations and a bit interleaved parity value can be performed by a lower cost processing block/module, and using fewer processor cycles than some other forms of evaluating the performance of transmission line 585. Furthermore, because the monitoring performed by BIP-10 processor 620 does not require regenerator 605 to perform forward error correction, transcoding, or otherwise process the content of the payload of the received frame, the monitoring by regenerator 605 is a "non-intrusive" monitoring. The monitoring of regenerator 605 can also be viewed as "non-intrusive" because there are no changes made to the received frame.

Next, in-band command extraction block 630 extracts and analyzes the command word contained in the frame or multiframe received over transmission link 585. Depending on the content of the command word extracted from the frame or multiframe, regenerator 605 can, for example, utilize the command word to perform the functions described above with regard to FIG. 3 above. Regenerator 605 will then regenerate and transmit the frame to receiver 510 over transmission link 635. Accordingly, to some examples, the regeneration and transmission over transmission link 635 may be controlled by the command word extracted by the in-band command extraction block 630. For example, the command word may define a particular wavelength over which the frame should be transmitted. Upon receipt at receiver 510, the frame will undergo a process analogous to that described above with reference to receiver 510 of FIG. 5.

Figure 7:
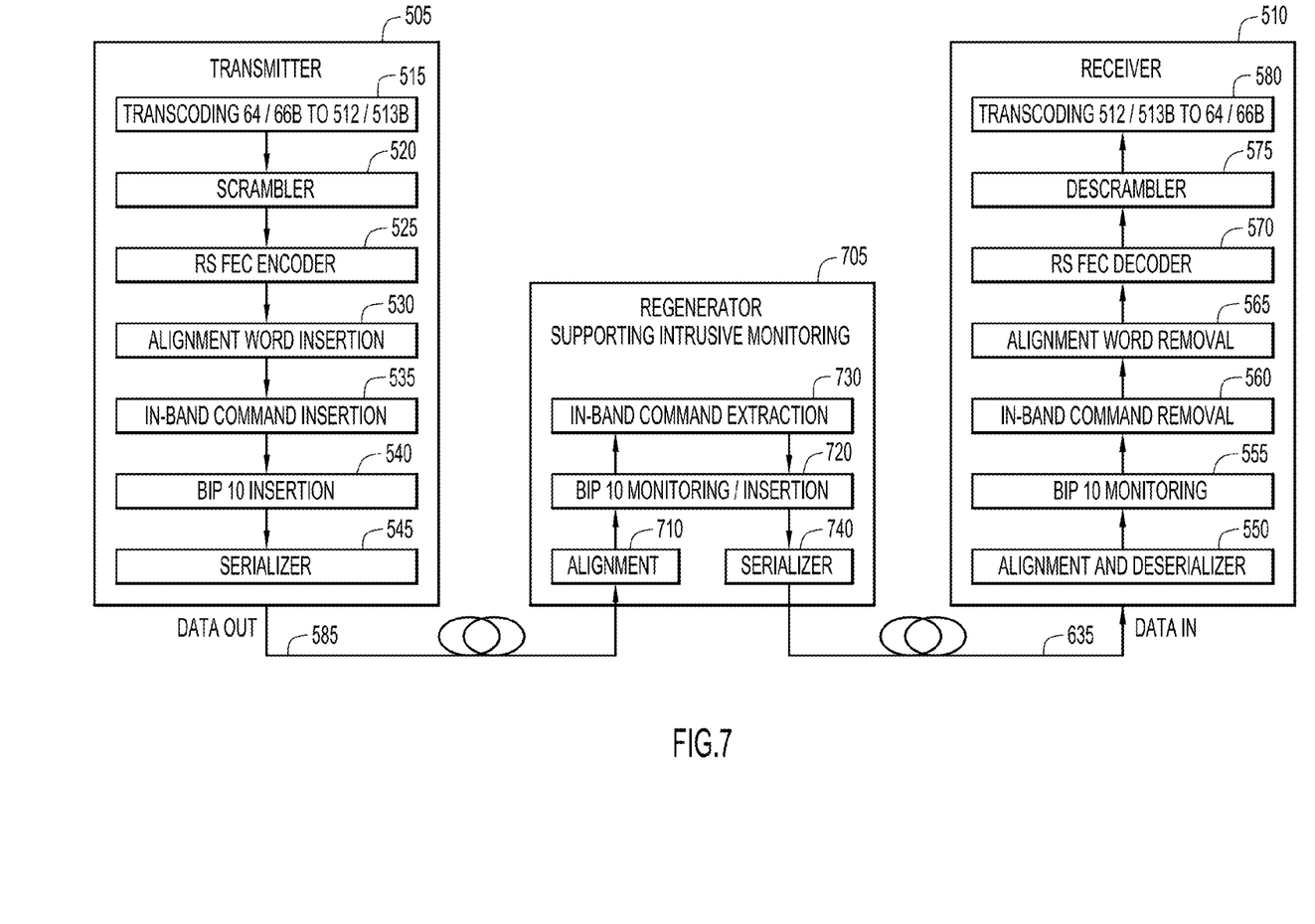
FIG. 7 is a block diagram of a transmitter, a receiver, and a regenerator configured to allow simple frame alignment and transmission link quality of service estimates, and in which intrusive monitoring of optical frames is performed, according to an example embodiment.

With reference now made to FIG. 7, depicted therein is an environment that is configured to perform intrusive monitoring of a frame or multiframe received at regenerator 705. The regenerator 705 includes an alignment block 710, a BIP 10 monitoring/insertion block 720, an in-band command extraction/insertion block 730 and a serializer 740. As with FIGS. 5 and 6, a frame is generated and transmitted by transmitter 505 as described above with reference to FIG. 5. Once the frame is received at regenerator 705, the frame is aligned by the alignment block 710 that recognizes the predetermined alignment word within the content of the received frame. Once aligned, the bit interleaved parity value is monitored by BIP-10 monitoring/insertion block 720. In-band command extraction/insertion block 730 extracts and analyzes the command word contained in the frame or multiframe received over transmission link 585, and carries out any necessary instructions contained in the command word.

In-band command extraction/insertion block 730 also modifies the frame, inserting a new command word, or modifying the pre-existing command word in the frame. For example, if an error is detected subsequent to the transmission of the frame by transmitter 505, the command word may be modified to reflect this change. Next, BIP-10 monitoring/insertion block 720 inserts a new bit interleaved parity value into the frame, which may be necessitated by the changes to the command word brought about by in-band command extraction/insertion block 730. Finally, the frame is serialized by serializer 740 and transmitted to receiver 510 via optical fiber 635. Because the frame is modified by BIP-10 monitoring/insertion block 720, the inspection performed by regenerator 705 is considered "intrusive" monitoring.

As illustrated through the examples of FIGS. 5-7, the techniques described herein allow for the transmission of optical frames, and 32GFC in particular, while also providing simpler bit error rate monitoring that does not require forward error correction termination and decoding. The techniques provide a simple perform alignment, provide shorter lock times for incoming optical transmission, and provide all of the above while maintain the same frequency of related 32GFC protocol transmissions. Furthermore, the techniques described herein can be implemented by digital signal processor logic gates in one or more application specific integrated circuits or on a simple field programmable gate array, or implemented directly in any manner in a pluggable module, thereby avoiding the use of costly application specific integrated chips that are currently used to provide bit error determinations using standard forward error correction. In other words, the techniques described herein provide an easy way to align and monitor emerging 32GFC links while maintaining forward error correction functionality and signal frequency. Accordingly, the techniques described herein simplify 32GFC transmissions over optical networks.

Figure 8:
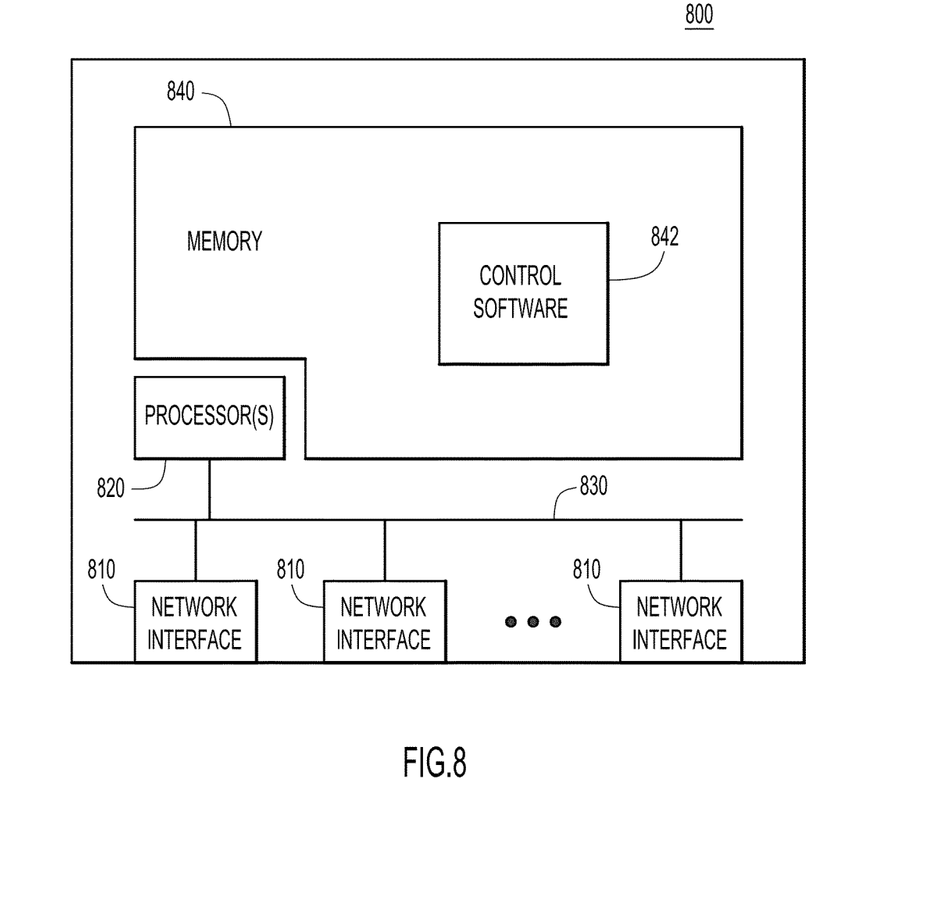
FIG. 8 is a block diagram of a device configured to transmit, receive, and/or otherwise process optical frames to allow simple frame alignment and transmission link quality of service estimates, according to an example embodiment.

With reference now made to FIG. 8, an example block diagram is shown of a device 800, and device 800 may be any one of a receiver, a transmitter, or a regenerator, as described above with reference to FIGS. 5-7 above. Accordingly, device 800 is configured to perform the techniques described herein. Device 800 includes network interfaces 810 which may be used to connect to other devices. Accordingly, network interfaces 810 may be embodied as optical transmitters or receivers, and may also comprise optoelectrical devices configured to convert optical signals to electrical signals, and vice versa. Network interfaces 810 may also include optical multiplexers/demultiplexers to facilitate, for example, wave division multiplexed communications and dense wave division multiplex communications, among other forms of optical communications. One or more processors 820 are provided to coordinate and control device 800. The processor 820 is, for example, one or more microprocessors or microcontrollers, and it communicates with the network interfaces 810 via bus 830. Memory 840 stores software instructions 842 which may be executed by the processor 820. For example, control software 842 for device 800 includes instructions for performing the generation of frames and multiframes at a node that transmits frames or multiframes, and processing of frames and multiframes at a node that receives frames or multiframes, as described above with reference to FIGS. 1-7. In other words, memory 840 includes instructions for device 800 to carry out the operations described above in connection with FIGS. 1-7.

Memory 840 may include read only memory (ROM), random access memory (RAM), magnetic disk storage media devices, optical storage media devices, flash memory devices, electrical, optical or other physical/tangible (e.g. non-transitory) memory storage devices. Thus, in general, the memory 840 may be or include one or more tangible (non-transitory) computer readable storage media (e.g., a memory device) encoded with software comprising computer executable instructions. When the instructions of the control software 842 is executed (by the processor 820), the processor is operable to perform the operations described herein in connection with FIGS. 1-7.

In summary, the techniques described herein provide methods of receiving optical frames and/or multiframes. The optical frames or multiframes are received over an optical link within an optical network. The optical frame has a payload of aggregated data, an alignment value, and a bit interleaved parity value. Content of the optical frame is aligned based on the alignment value in order to locate the bit interleaved parity value within the optical frame. The bit interleaved parity value is monitored. In response to the monitoring, a transmission quality of the transmission link is determined based on the bit interleaved parity value.

Also described herein are techniques for generating frames and/or multiframes for transmission in optical networks. The method includes transcoding data into aggregated data. Forward error correction bits are generated for the aggregated data. An alignment value is generated that specifies how content is aligned within an optical frame, as is a bit interleaved parity value for the aggregated data. The aggregated data is serialized to form serialized data. The optical frame is generated that comprises the serialized data, the forward error correction bits, the bit interleaved parity value, and the alignment value. The optical frame is the transmitted over a link of an optical network.

Finally, an apparatus configured to carry out the above described techniques. The apparatus includes optical receiver; and a processor coupled to the optical receiver. The processor is configured to: receive via the optical receiver an optical frame over a link in an optical network, wherein the optical frame has a payload including aggregated data, an alignment value and a bit interleaved parity value; align content of the optical frame based on the alignment value in order to locate the bit interleaved parity value within the optical frame; monitor the bit interleaved parity value; and determine a transmission quality of the link based on the interleaved parity bit value.

The above description is intended by way of example only. Various modifications and structural changes may be made therein without departing from the scope of the concepts described herein and within the scope and range of equivalents of the claims.

What is claimed is:

1. A method comprising:
   receiving an optical frame over a link within an optical network, wherein the optical frame has a payload including aggregated data, an alignment value and a bit interleaved parity value, wherein receiving the optical frame comprises receiving a multiframe comprising a plurality of headers, a plurality of payloads and a plurality of forward error correction fields, wherein a first header of the plurality of headers includes the bit interleaved parity value, and a second header of the plurality of headers includes at least a portion of the alignment value;
   aligning content of the optical frame based on the alignment value to locate the bit interleaved parity value within the optical frame;
   monitoring the bit interleaved parity value; and
   determining a transmission quality of the optical link based on the bit interleaved parity value.

2. The method of claim 1, further comprising:
   performing forward error correction on the optical frame with the plurality of forward error correction fields in response to the determining.

3. The method of claim 1, wherein the plurality of payloads includes a plurality of aggregated data blocks.

4. The method of claim 3, wherein the plurality of payloads comprises a plurality of 512/513B aggregated data blocks.

5. The method of claim 1, wherein the bit interleaved parity value comprises a BIP 10 value.

6. The method of claim 1, wherein the alignment value is split between the second header and a third header of the plurality of headers.

7. The method of claim 1, further comprising:
   regenerating the frame to produce a regenerated frame; and
   transmitting the regenerated frame over another link.

8. The method of claim 1, further comprising:
   de-serializing the frame;
   removing the alignment value from the frame;
   performing forward error correction on the plurality of payloads to produce error-corrected payloads;
   descrambling the error-corrected payloads; and
   transcoding the error-corrected payloads from 512/513B aggregated data to 64/66B data.

9. A method comprising:
   transcoding data into aggregated data;
   generating forward error correction bits for the aggregated data;
   generating an alignment value that specifies how content is aligned within an optical frame;
   generating a bit interleaved parity value for the aggregated data;
   serializing the aggregated data to produce serialized data;
   generating the optical frame including the serialized data, the forward error correction bits, the bit interleaved parity value, and the alignment value, wherein generating the optical frame comprises arranging the aggregated data into a plurality of payloads, inserting the bit interleaved parity value into a first header of a plurality of headers of the optical frame and inserting at least a portion of the alignment value into a second header of the plurality of headers of the optical frame; and
   transmitting the optical frame over a transmission link of an optical network.

10. The method of claim 9, wherein transcoding the data comprises transcoding 64/66B data to 512/513B data.

11. The method of claim 9, wherein generating the bit interleaved parity value comprises generating a BIP-10 value.

12. The method of claim 9, wherein the alignment value is split between the second header and a third header of the plurality of headers.

13. The method of claim 9, further comprising generating an in-band command value, and inserting the in-band command value in the optical frame.

14. An apparatus comprising:
   an optical receiver; and
   a processor coupled to the optical receiver, and configured to:
      receive via the optical receiver an optical frame over a link in an optical network, wherein the optical frame has a payload including aggregated data, an alignment value and a bit interleaved parity value, wherein the processor receives the frame as a multiframe comprising a plurality of headers, a plurality of payloads and a plurality of forward error correction fields, wherein a first header of the plurality of headers includes the bit interleaved parity value, and a second header of the plurality of headers includes at least a portion of the alignment value;

align content of the optical frame based on the alignment value to locate the bit interleaved parity value within the optical frame;

monitor the bit interleaved parity value; and determine a transmission quality of the link based on the bit interleaved parity value.

15. The apparatus of claim 14, wherein the processor is further configured to:

perform forward error correction on the optical frame with the plurality of forward error correction fields based on the transmission quality.

16. The apparatus of claim 14, wherein the bit interleaved parity value is a BIP 10 value.

17. The apparatus of claim 14, wherein the alignment value is split between the second header and a third header of the plurality of headers.

18. The apparatus of claim 14, further comprising an optical transmitter, wherein the processor is further configured to:

regenerate the frame to produce a regenerated frame; and transmit via the optical transmitter the regenerated frame over another link.

19. The apparatus of claim 14, wherein the processor is further configured to:

de-serialize the frame;

remove the alignment value from the frame;

perform forward error correction on the plurality of payloads to produce error-corrected payloads;

descramble the error-corrected payloads; and transcode the error-corrected payloads from 512/513B aggregated data to 64/66B data.

20. The apparatus of claim 14, wherein the plurality of payloads comprises a plurality of 512/513B aggregated data blocks.

* * * * *